April 24, 1951
C. E. NORTH
2,550,288
CLARIFYING BUTTER FAT
Filed Oct. 9, 1946
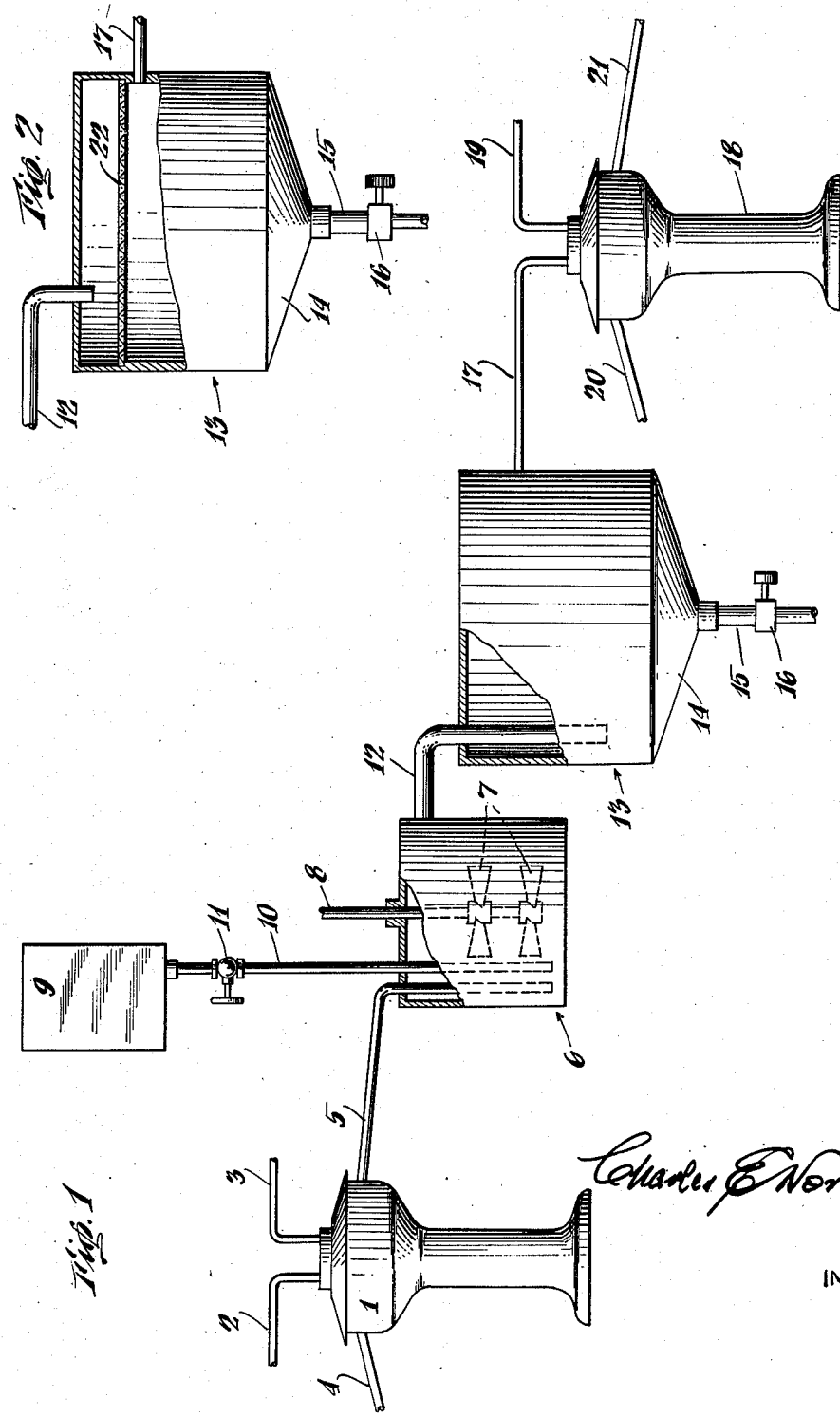
Charles E North
INVENTOR Patented Apr. 24, 1951

2,550,288

UNITED STATES PATENT OFFICE 2,550,288

CLARIFYING BUTTERFAT

Charles E. North, Montclair, N. J.

Application October 9, 1946, Serial No. 702,113

11 Claims. (Cl. 99—119)

This invention relates to the treatment of butter fat and involves particularly the clarification of such fatty materials.

As is well known, milk and cream are emulsions of butter fat or milk oil in an aqueous medium, the fat or oil being present in the form of minute globules each one of which is surrounded by a coating or jacket of an emulsifying agent or agents. The latter include such compounds as casein, albumin, globulin and lecithin. The spaces or interfaces between the fat globules and aqueous medium (or milk serum) are filled with a film of a hydrophilic colloid which is called an adsorption film and which is composed of the emulsifying agents combined with sufficient water to form a coating or jacket around the fat globules. This hydrophilic colloid is shared by similar colloidal material suspended in the aqueous medium surrounding the fat globules, but is more concentrated around these globules than in the surrounding medium.

Butter fat or milk oil is extracted or recovered from cream in the usual procedure by churning the latter while maintained at a temperature, say, of 45° to 50° F. This operation results, first, in saturating the cream with air in the form of bubbles, then secondly of releasing or breaking the fat globules from their enclosing jackets or coatings, and thirdly of agglomerating the milk oil into lumps of solid butter fat. Afterwards, these lumps are washed one or more times with cold water to eliminate any residual milk and also solids not fat. Next, the fat may be melted and subjected to a centrifuging operation (while in the molten state) to separate water and/or solids not fat which may be entrained in the molten material.

Butter fat or milk oil made by such process always yields a cloudy or turbid liquid when melted. This cloudiness or turbidity can be ascribed to the presence of small proportions of water and emulsifying agents, chiefly casein and to a less extent to albumin, lecithin and other solids not fat which give rise to the adsorption film previously mentioned as filling the interfaces between and coating the fat globules in cream. Although the proportion of materials causing this cloudiness is small, usually 1 per cent or less and in many instances of the order of 0.1 per cent, nevertheless it is impossible to eliminate this cloudiness by washing the milk oil or butter fat with water. Nor can the turbidity be overcome by subjecting the melted fat to a centrifuging operation, since the hydrophilic colloid has a specific gravity almost identical with that of milk oil.

One object of my invention is the production of butter fat or milk oil which is substantially free of all cloudiness or turbidity when melted. Another object is to provide a method for the production of such non-turbid liquid fat. Still another object is a continuous process for accomplishing these results. Other objects and advantages of my invention will be apparent from the disclosures made herein.

In the accompanying drawing, Fig. 1 illustrates one type of apparatus in which butter fat or milk oil can be treated according to my invention. Fig. 2 illustrates a modification of one step in my process.

In Fig. 1 of this drawing, centrifuge 1 contains feed pipes 2 and 3 for melted fat and hot water, respectively. To this centrifuge are attached discharge pipes 4 and 5 for hot water and liquid fat, respectively. Pipe 5 leads into chamber 6 in which are located paddles 7 which are held in place and rotated (by suitable means) by shaft 8.

Reservoir 9, in which is stored an aqueous solution of an acid, is connected with chamber 6 by means of pipe 10; and valve 11 which serves as a means of regulating the flow of aqueous liquid forms a part of pipe 10.

Pipes 5 and 10 either may terminate a short distance within chamber 6 or, as indicated by the dotted portions (in the drawing), these pipes may extend to points located near the bottom of this chamber.

Chamber 6 is connected by overflow pipe with settling tank 13. The latter contains a conical bottom 14 in the center of which is drain pipe 15 which in turn leads to valve 16. Overflow pipe 17 is attached to tank 13 and empties into centrifuge 18. To the latter are attached feed pipe 19 and discharge pipes 20 and 21.

Both chamber 6 and tank 13 are heated by any convenient and appropriate means which may be located either externally or internally. Such heating means are not shown in the accompanying drawing.

In Fig. 2 is shown a modification of tank 13 in which a filter 22 is placed just below the end of overflow pipe 12 (from chamber 6). This filter can be made of any convenient and appropriate materials, e. g., cheese cloth which is supported and held in place by a wire screen.

The operation of the apparatus as shown in Fig. 1 is as follows: A stream of turbid melted butter fat (from a previous operation) is forced through pipe 2 into centrifuge 1. Simultaneously, a stream of hot water is forced through pipe 3 into this same centrifuge. A convenient ratio by volume of these two liquids is 4 of water to 1 of fat. The two liquids are mixed and afterwards separated by centrifugal action, the hot water being discharged through pipe 4 and the liquid fat through pipe 5.

The melted fat passes into chamber 6 and simultaneously a stream of aqueous acid flows from reservoir 9 through pipe 10 into this same chamber. The liquid fat and aqueous acid are intimately contacted and thoroughly mixed by rotating paddles 7. If pipes 5 and 10 terminate a short distance within chamber 6, then the two simultaneous incoming streams of liquid fat and aqueous acid cause the liquid mixture to become greater and greater in volume until it finally overflows through pipe 12 into settling tank 13. However, should pipes 5 and 10 terminate near the bottom of chamber 6, then the incoming streams of fat and acid gradually displace the mixture (in chamber 6) and cause it to overflow through pipe 12 into tank 13. Here the mixture separates into aqueous and oleaginous layers. From time to time, portions of the aqueous layer and also any precipitated or suspended material therein are withdrawn from tank 13 by means of pipe 15 and valve 16. As the tank continues to fill, due to the incoming mixture of liquid fat and aqueous acid, the layer of melted fat becomes sufficiently large in volume so that it overflows through pipe 17 into centrifuge 18.

In this centrifuge the liquid fat meets and is admixed with a stream of hot water which comes into centrifuge 18 through pipe 19. This mixture of fat and water is subjected to centifugal action and the wash water is discharged through pipe 20 and the washed fat through pipe 21.

During the afore-mentioned operations, chamber 6 and tank 13 are maintained in a heated condition so that the fat at all times is in a liquid or molten condition. The temperature limits within which I prefer to treat butter fat range from about 96° F. (approximately the melting point of the fat) to about 212° F. (the boiling point of water). Furthermore, the aqueous acidic liquid withdrawn from tank 13 through pipe 15 and valve 16 may be filtered to remove suspended and/or precipitated material and then, after addition of water or of acid as the case may be to restore it to the proper concentration, returned to reservoir 9 and used again.

As a modification of my process, tank 13 as shown in Fig. 2 can be substituted for the similar tank of Fig. 1. When this substitution is made, then the mixture of aqueous acid and liquid fat coming from chamber 6 through pipe 12 passes through filter 22 before it separates into two layers in tank 13. After this separation takes place, the liquid fat flows through pipe 17 into centrifuge 18 where it (fat) is treated as mentioned above. The use of this filter serves to eliminate any agglomerated or coagulated material which results from the treatment of liquid fat with aqueous acid in chamber 6.

In some instances, only a very small volume of aqueous acid (due, for example, to its relatively high concentration) will be required for treatment of liquid fat. In such cases, the liquid mixture of fat and acid after passing through filter 22 (in tank 13) will not separate into aqueous and oleaginous layers, or only so to a small degree. When this condition holds, then the liquid mixture leaves tank 13 through pipe 17 and goes into centrifuge 18 where the fat and acid are separated by washing the mixture with water.

As the butter fat comes from the first washing operation (i. e., from centrifuge 1 in the drawing) it will contain a small proportion of water, say 10 per cent or thereabouts. It may be necessary at times to take into account this amount of water to prevent the aqueous acid from becoming too dilute after it has been fed into chamber 6 and admixed with the water-containing fat. For example, if it is desired to treat the butter fat when it comes into chamber 6 with an aqueous acid whose concentration is 1 per cent, and if the proportion of water in the fat is 10 per cent and the concentration of the acid solution (in reservoir 9) is 2 per cent, then the ratio by volume at which liquid fat and aqueous acid are fed into chamber 6 will be 10 volumes of fat to 1 volume of acid. I do not mean to limit my process to these conditions since they are merely illustrative as to proportioning the rates of flow of liquid fat and aqueous acid so that the fat will be treated with an aqueous acid of a predetermined or desired concentration.

The concentration of the aqueous acid which is in contact with the liquid and melted fat may be as small as 0.5 per cent or as much as 5, 10 or 20 per cent, or even greater, but in any case should be great enough to effect agglomeration and/or precipitation of those bodies in the melted fat to which cloudiness or turbidity can be attributed. In no event should the concentration of the acid solution be large enough to exert a harmful or deleterious effect on the fat. In many instances, melted butter fat in contact with an aqueous acid whose concentration is 0.7 to 1 per cent will be suitable conditions for clarification of the fat.

Many mineral or carboxylic acids are applicable for my process. Examples of mineral acids which I may use are sulfuric, hydrochloric, hydrobromic or phosphoric. Illustrations of carboxylic acids, which may be either acyclic or cyclic, are formic, acetic, oxalic, prehnitic or malonic. I may employ also hydroxy-substituted carboxylic acids, that is acids containing one or more hydroxy groups in addition to one or more carboxy groups, e. g., tartaric, lactic or mandelic acid. Other substituted acids, such as levulinic acid, may be useful. Preferably, the acids employed by me are those which exhibit an appreciable or substantial solubility in water at room temperature, will not exert any damaging or injurious action on the fat, and are stable at temperatures used in treating the fat. As a guide, the acids (suitable for my purpose) should be capable of furnishing aqueous solutions whose concentrations are 0.5 per cent or greater at room temperature.

It will be seen from the foregoing disclosures that my invention involves the treatment of butter fat which on being melted yields a cloudy or turbid liquid. My invention also includes the removal or elimination of this cloudiness or turbidity whereby a substantially clear liquid fat is obtained. The steps whereby I secure these results include comingling a stream of the liquid turbid fat with a stream of aqueous acid, intimately admixing and contacting the liquid fat with aqueous acid, and then separating the liquid fat from the aqueous acid and washing the separated liquid fat with water. During all of these steps, the fat is maintained at a temperature not less than its melting point (about 96° F.) and not greater than 212° F. (or the boiling point of water). These various steps can be performed in sequence and therefore constitute a continuous process for the treatment of butter fat.

My process can be modified in some instances by conducting the mixture of liquid fat and aqueous acid (after they have been intimately contacted and thoroughly admixed) through a filter. In this manner any agglomerated or precipitated material is removed, in whole or in part, before separation of the mixture into fatty and aqueous layers. Also, when the proportion of aqueous acid (which is admixed with the liquid fat) is small, then the mixture after passing through the filter can be conducted directly to a washing and centrifuging operation thereby eliminating the step of separation into aqueous and oleaginous layers.

By the term butter fat I mean those fatty bodies or substances which occur in milk or cream and can be extracted or recovered therefrom. My process is applicable to the treatment of these substances whether they be in the form of butter which contains an appreciable proportion of water or in the form of milk oil which is substantially anhydrous fat.

As an illustration of the treatment of butter fat, in one instance a sample of the latter containing 4 per cent of water was fed into the mixing zone (chamber 6 of the drawing) at the rate of 250 pounds per hour. Aqueous 1 per cent lactic acid was admixed with the stream of fat at the rate of 25 pounds per hour. This operation gave a mixture in which the liquid fat was in contact with substantially 0.7 per cent aqueous lactic acid. The mixing zone was maintained at a temperature just below the boiling point of water. The mixture of fat and acid was passed through a filter and then to a centrifuge in which it was admixed with hot water and then separated into aqueous liquid and melted fat by a centrifuging operation. The molten fat initially was cloudy and turbid but after treatment was free of cloudiness and turbidity and had the appearance of a clear, transparent, light yellow colored liquid.

What I claim is:

1. The process which comprises comingling a stream of turbid liquid butter fat containing about 99 per cent fat with a stream of aqueous acid, and while maintaining the fat in a molten condition and said aqueous acid at a concentration of at least about 0.5 per cent but insufficiently great to effect deterioration of said fat, conducting said comingled streams into a mixing zone, intimately admixing and contacting the liquid fat and aqueous acid in said zone, withdrawing the admixture of liquid fat and aqueous acid from said zone, then separating by gravity settling the liquid fat in said withdrawn admixture from the aqueous acid, and washing the separated liquid fat with water.

2. The process which comprises comingling a stream of turbid liquid butter fat containing about 99 per cent fat with a stream of aqueous acid, and while maintaining the liquid fat and aqueous acid at a temperature not less than about 96° F. and not more than about 212° F. and said aqueous acid at a concentration of at least about 0.5 per cent but insufficiently great to effect deterioration of said fat, conducting said comingled streams into a mixing zone, intimately admixing and contacting the liquid fat and aqueous acid in said zone, withdrawing the admixture of liquid fat and aqueous acid from said zone, then separating by gravity settling the liquid fat in said withdrawn admixture from the aqueous acid, and washing the separated liquid fat with water.

3. The process which comprises comingling a stream of turbid liquid butter fat containing about 99 per cent fat with a stream of aqueous acid, and while maintaining the liquid fat and aqueous acid at a temperature not less than about 96° F. and not more than about 212° F. and said aqueous acid at a concentration of at least about 0.5 per cent but insufficiently great to effect deterioration of said fat, conducting said comingled streams into a mixing zone, intimately admixing and contacting the liquid fat and aqueous acid in said zone, displacing the admixture of liquid fat and aqueous acid from said zone by said comingling streams of fat and acid, then separating by gravity settling the liquid fat in said displaced mixture from the aqueous acid, and washing the separated liquid fat with water.

4. The process which comprises comingling a stream of turbid liquid butter fat containing about 99 per cent fat with a stream of aqueous acid, and while maintaining the liquid fat and aqueous acid at a temperature not less than about 96° F. and not more than about 212° F. and the concentration of the aqueous acid in contact with the liquid fat at not less than about 0.5 per cent and not more than about 1 per cent, conducting said comingled streams into a mixing zone, intimately admixing and contacting the liquid fat and aqueous acid in said zone, displacing the admixture of liquid fat and aqueous acid from said zone by said comingling streams of fat and acid, then separating by gravity settling the liquid fat in said displaced admixture from the aqueous acid, and washing the separated liquid fat with water.

5. The process according to claim 4 in which the aqueous acid is an aqueous solution of a mineral acid.

6. The process according to claim 4 in which the aqueous acid is an aqueous solution of a carboxylic acid.

7. The process according to claim 4 in which the aqueous acid is an aqueous solution of a hydroxy-substituted carboxylic acid.

8. The process which comprises comingling a stream of turbid liquid butter fat containing about 99 per cent fat with a stream of aqueous acid, and while maintaining the liquid fat and aqueous acid at a temperature not less than about 96° F. and not more than about 212° F. and said aqueous acid at a concentration of at least about 0.5 per cent but insufficiently great to effect deterioration of said fat, conducting said comingled streams into a mixing zone, intimately admixing and contacting the liquid fat and aqueous acid in said zone, displacing the admixture of liquid fat and aqueous acid from said zone by said comingled streams of fat and acid, passing said displaced admixture through a filter, then separating by gravity settling the liquid fat in said filtered admixture from the aqueous acid, and washing the separated fat with water.

9. The process which comprises comingling a stream of turbid liquid butter fat containing about 99 per cent fat with a stream of aqueous acid, and while maintaining the liquid fat and aqueous acid at a temperature not less than about 96° F. and not more than about 212° F. and said aqueous acid at a concentration of at least about 0.5 per cent but insufficiently great to effect deterioration of said fat, conducting said comingled streams into a mixing zone, intimately admixing and contacitng the liquid fat and aqueous acid in said zone, displacing the admixture of liquid fat and aqueous acid from said zone by said comingling streams of fat and acid, passing said displaced admixture through a filter, and then washing said filtered admixture with water.

10. The process which comprises comingling a stream of turbid liquid butter fat containing about 99 per cent fat with a stream of aqueous lactic acid, and while maintaining the liquid fat and aqueous acid at a temperature not less than about 96° F. and not more than about 212° F. and the concentration of the aqueous lactic acid in contact with the liquid fat at about 0.7 per cent, conducting said comingled streams into a mixing zone, intimately admixing and contacting the liquid fat and aqueous lactic acid in said zone, displacing the admixture of liquid fat and aqueous lactic acid from said zone by said comingling streams of fat and acid, passing said displaced admixture through a filter, and then washing said filtered admixture with water.

11. The process which comprises continuously comingling a stream of liquid turbid butter fat containing about 99 per cent fat with a stream of aqueous acid, and while maintaining the liquid fat and aqueous acid at a temperature not less than about 96° F. and not more than about 212° F. and the concentration of the aqueous acid in contact with the liquid fat at not less than about 0.5 per cent and not more than about 1 per cent, continuously conducting said comingled streams into a mixing zone, continuously and intimately admixing and contacting the liquid fat and aqueous acid in said zone, continuously displacing the admixture of liquid fat and aqueous acid by said comingling streams of fat and acid, continuously conducting said displaced admixture into a settling zone whereby separation into layers of liquid fat and aqueous acid is effected, continuously displacing said layer of liquid fat from said settling zone with liquid fat separating from the mixture conducted into said settling zone, and washing the displaced liquid fat from said settling zone with water.

CHARLES E. NORTH.

REFERENCES CITED

The following references are of record in the file of this patent:

UNITED STATES PATENTS

| Number | Name | Date |
| --- | --- | --- |
| 2,365,217 | Rogers | Dec. 19, 1944 |
| 2,414,837 | Riggs | Jan. 28, 1947 |